(12) United States Patent
Bell

(10) Patent No.: US 9,547,395 B2
(45) Date of Patent: Jan. 17, 2017

(54) TOUCH AND HOVER SENSING WITH CONDUCTIVE POLARIZER

(71) Applicant: Microsoft Technology Licensing, LLC, Redmond, WA (US)

(72) Inventor: Cynthia Sue Bell, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

(21) Appl. No.: 14/055,690

(22) Filed: Oct. 16, 2013

(65) Prior Publication Data

US 2015/0103032 A1    Apr. 16, 2015

(51) Int. Cl.
| | |
|---|---|
| *G06F 3/045* | (2006.01) |
| *G02F 1/1335* | (2006.01) |
| *G06F 3/044* | (2006.01) |
| *G06F 3/041* | (2006.01) |

(52) U.S. Cl.
CPC ............. *G06F 3/044* (2013.01); *G06F 3/041* (2013.01); *G06F 3/0412* (2013.01); *G06F 3/0416* (2013.01); *G06F 2203/04103* (2013.01); *G06F 2203/04108* (2013.01)

(58) Field of Classification Search
CPC ............ G02F 1/13338; G02F 1/133528; G02F 1/133602; G02F 1/13439; G02F 2001/133548; G06F 3/044; G06F 1/1692
USPC .................... 345/174; 349/62, 122; 136/256
See application file for complete search history.

(56) References Cited

U.S. PATENT DOCUMENTS

| | | | |
|---|---|---|---|
| 6,717,083 B2 | 4/2004 | Chen et al. | |
| 6,977,702 B2 | 12/2005 | Wu | |
| 7,605,883 B2 | 10/2009 | Yamaki et al. | |
| 8,964,150 B2* | 2/2015 | Ishii et al. | 349/122 |
| 2008/0266273 A1 | 10/2008 | Slobodin et al. | |

(Continued)

FOREIGN PATENT DOCUMENTS

| | | |
|---|---|---|
| EP | 2492783 A2 | 8/2012 |
| WO | 0157841 A1 | 8/2001 |

(Continued)

OTHER PUBLICATIONS

European Patent Office, International Search Report and Written opinion Issued in PCT Patent Application No. PCT/US2014/059793, Jan. 8, 2015, 10 Pages.

(Continued)

*Primary Examiner* — Andrew Sasinowski
*Assistant Examiner* — Kuo Woo
(74) *Attorney, Agent, or Firm* — Brandon Roper; Judy Yee; Micky Minhas

(57) ABSTRACT

Embodiments are disclosed that relate to touch and proximity sensing with a touch sensor that utilizes a conductive polarizer as a touch sensor electrode. For example, one disclosed embodiment provides a touch sensitive display device including a display having a transparent electrode layer including a plurality of transparent electrodes, a conductive polarizer coupled to the transparent electrode layer via a dielectric layer, a touch sensing driver circuit electrically connected to one of the transparent electrode layer and the conductive polarizer, and a touch sensing receiver circuit electrically connected to another of the transparent electrode layer and the conductive polarizer.

12 Claims, 13 Drawing Sheets

(56) References Cited

U.S. PATENT DOCUMENTS

| | | |
|---|---|---|
| 2009/0315840 A1 | 12/2009 | Park et al. |
| 2010/0097344 A1 | 4/2010 | Verweg |
| 2010/0117988 A1 | 5/2010 | Jacobs et al. |
| 2010/0163106 A1* | 7/2010 | Tachibana ............... 136/256 |
| 2010/0321621 A1* | 12/2010 | Kikuchi ............... G06F 3/044 349/122 |
| 2011/0063246 A1* | 3/2011 | Wei et al. ............... 345/174 |
| 2011/0267317 A1 | 11/2011 | Tsuda |
| 2012/0280941 A1 | 11/2012 | Hu |
| 2013/0127776 A1 | 5/2013 | Guard et al. |
| 2013/0169593 A1 | 7/2013 | Imamura et al. |
| 2014/0176819 A1* | 6/2014 | Yilmaz ............... G06F 1/1692 349/12 |
| 2015/0055057 A1* | 2/2015 | Huang ............... 349/62 |

FOREIGN PATENT DOCUMENTS

| | | |
|---|---|---|
| WO | 2013063183 A1 | 5/2013 |
| WO | 2013130228 A1 | 9/2013 |

OTHER PUBLICATIONS

IPEA European Patent Office, International Preliminary Report on Patentability Issued in Application No. PCT/US2014/059793, Sep. 25, 2015, WIPO, 6 Pages.

Purcher, Jack, "Apple's iPhone 5 Integrated Touch Display Technology Comes to Light and it Loudly Screams it's Coming to All Macs Eventually", Published on: Feb. 21, 2013, Available at: http://www.patentlyapple.com/patently-apple/2013/02/apples-iphone-5-integrated-touch-display-technology-comes-to-light-and-it-loudly-screams-its-coming-to-all-macs-eventually.html.

* cited by examiner

TOUCH AND HOVER SENSING WITH CONDUCTIVE POLARIZER

BACKGROUND

Touch sensitive display devices utilize a touch sensor to detect a location of touch over an image displayed on a display. The touch sensor and the display each may comprise multiple layers of materials. For example, a touch sensor may include two separate electrode structures that each comprises an electrode support substrate, a transparent electrode layer, and an adhesive layer. Likewise, in the case of a liquid crystal display (LCD), the display may include a thin film transistor (TFT) substrate, a TFT layer formed on the TFT substrate, polarizers, a liquid crystal layer, a color filter support layer (e.g. a sheet of glass), and a color filter layer formed on the color filter support layer. A touch sensitive display device also may include other layers, such as a cover glass layer and decorative layers (e.g. a bezel surrounding the display area). Each of these layers contributes to the overall thickness of a touch sensitive device.

SUMMARY

Various embodiments are disclosed that relate to touch and hover sensing with a touch sensor that utilizes a conductive polarizer as a touch sensor electrode. For example, one disclosed embodiment provides a touch sensitive display device comprising a display having a transparent electrode layer including a plurality of transparent electrodes, a conductive polarizer coupled to the transparent electrode layer via a dielectric layer, a touch sensing driver circuit electrically connected to one of the transparent electrode layer and the conductive polarizer, and a touch sensing receiver circuit electrically connected to another of the transparent electrode layer and the conductive polarizer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, a touch sensitive display device may include many individual structural layers that contribute to the thickness of a device. Thus, utilizing a relatively fewer number of layers may help in the manufacture of thinner and lighter weight devices, which may be appealing to consumers.

Further, as displays trend toward higher resolution, light transmissivity from the backlight to the display surface of the device may decrease. To compensate, users may increase a brightness of a backlight. However, this may drain battery charge more quickly. As light from the backlight may be lost due to reflections at boundaries between layers in a touch sensitive display device, reducing a number of layers between the backlight and display surface may help to increase image brightness.

In light of such issues, various methods of reducing a number of layers used to form the touch sensor and/or display of touch sensitive devices have been proposed. For example, some devices may utilize "in-cell" touch sensing technology. In-cell touch sensors utilize the TFT layer of a display device as one set of electrodes for touch sensing. This permits the omission of at least one set of touch sensor electrodes, as well as the substrate and adhesive layers for the omitted electrodes. Further, some in-cell touch sensors may place the other set of electrodes on the color filter support layer of the display, or utilize a common voltage layer in the display as the other set of electrodes. This may allow omission of both touch sensor electrode substrate and adhesive layers compared to a device with a separate touch sensor and display.

Figure 1A:
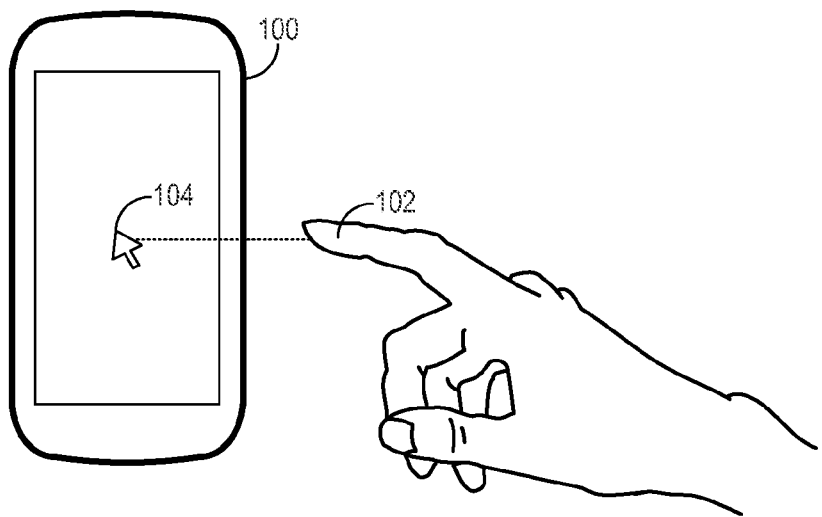
FIGS. 1A-1B show a user interacting with an example embodiment of a touch sensitive display device via hover inputs.
Figure 1B:
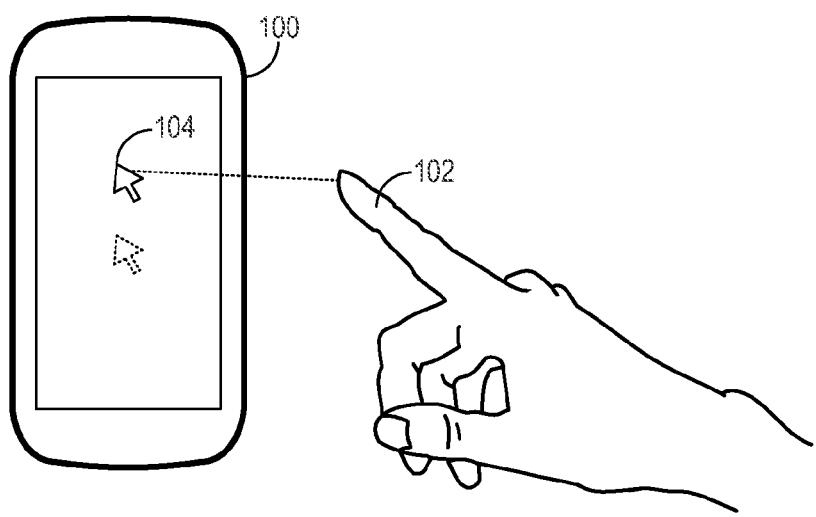

However, "in cell" touch sensing device may have lower sensitivity for detecting hover inputs compared to conventional touch sensors. FIGS. 1A and 1B depict an example embodiment of a hover interaction with a touch sensitive display device 100 in which a user moves a finger 102 close to, but not touching, the display device, to control a cursor 104. The term "touch sensitive display device" as used herein may represent devices that are configured to detect touch and hover events via a touch sensor of the device.

Hover may be detected via changes in electrode capacitance caused by a proximity of a part of a human body to the touch sensor. As such, in-cell touch sensing may be disadvantageous for hover detection due to the number of layers separating the touch sensor from a user's finger compared to a separate touch sensor located over a display. Further, the TFTs that drive the pixels of the display may have too low of a breakdown voltage to be driven at a sufficient voltage to detect hover at desired distances. As a result, in-cell touch sensors may have difficulty detecting hover at distances farther than 1-2 cm from a touch surface.

One possible solution to such issues may be to use a separate touch sensor and display, and locate the touch sensor between the display and the device touch surface, as used in conventional touch devices. However, this may increase device thickness relative to the use of in-cell touch sensing.

Thus, embodiments are disclosed herein that relate to the sensing of touch and hover via a touch sensor that utilizes a conductive polarizer as one of the touch sensor electrode layers. Briefly, LCD displays utilize a polarizer to polarize light from a backlight unit, thus providing polarized light to the LCD layer of the display. The liquid crystals may selectively rotate the polarization of the light at each pixel based upon the state of the TFT for that pixel. Light at each pixel is then selectively passed or blocked by another polarizer depending upon the polarization state of the light. Polarizers also may be used to help reduce glare from a display screen.

In conventional touch sensitive display devices, as well as in in-cell touch sensing devices, these polarizers may be stand-alone layers with no combined functionality. However, a conductive polarizer may have sufficient electrical conductivity to also act as electrode layer in a touch sensor. One example of a conductive polarizer that may be suitable for use as a touch sensor electrode is a wire grid polarizer. A wire grid polarizer may comprise a series of fine pitch, parallel wires formed on a substrate. The wires may be formed, for example, of aluminum lines having a pitch of 100-150 nm patterned on a flexible film substrate.

Wire grid polarizers may offer various advantages over other polarizers. For example, some polarizers may be manufactured from stretched iodine-dyed poly(vinyl alcohol) (PVA) film. However, such polarizers may transmit only about 36% of impinging light, and may leak some light in short blue and long red wavelengths. As a result, images formed by an LCD using such polarizers may shift to a slightly more purple hue. This leakage also may affect a dark state of the display.

Figure 2:
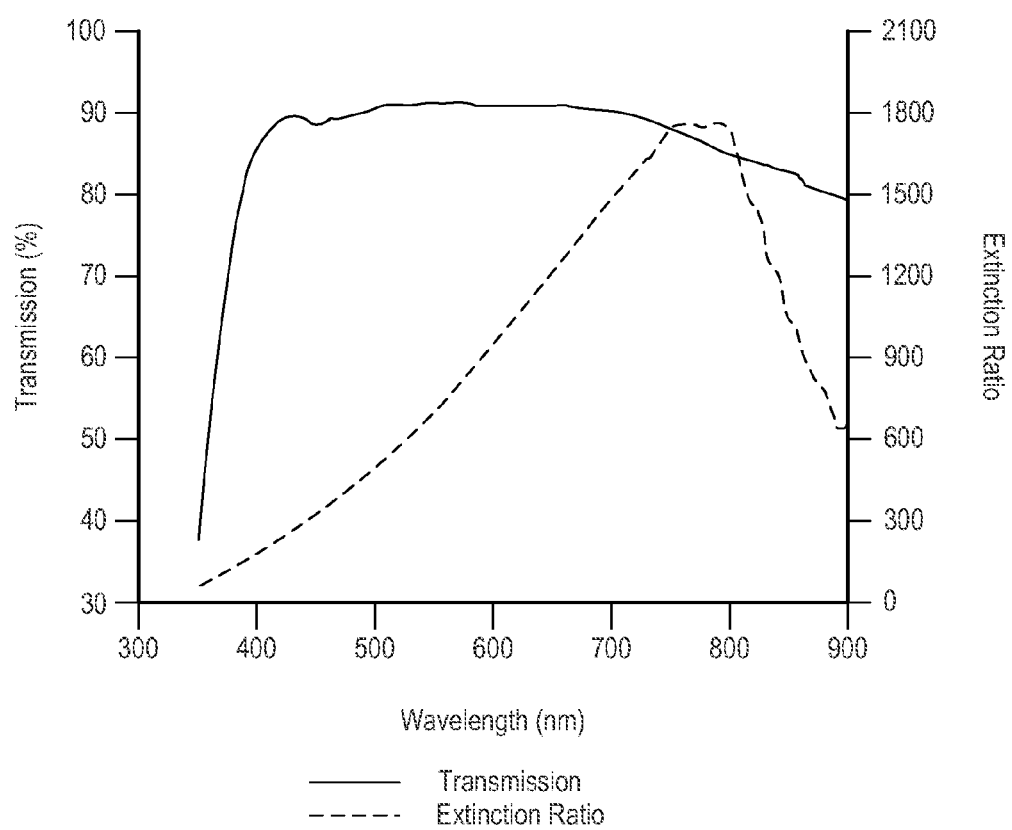
FIG. 2 shows a schematic depiction of layers of a touch sensitive display device according to an embodiment of the disclosure.

In contrast, a wire grid polarizer may transmit 45% of impinging light, which is substantially higher than that transmitted by PVA polarizers. Further, wire grid polarizers may have more consistent viewing performance over an entire range of viewing angles than a stretched PVA polarizer, and may have lower leakage, thereby leading to higher contrast images. FIG. 2 shows a graph depicting a transmission and extinction ratio of a wire grid polarizer, and illustrates that transmission is highly uniform across visible wavelengths. While discussed herein in the context of a wire grid polarizer, it will be understood that any other suitable conductive polarizer may be used.

Figure 3:
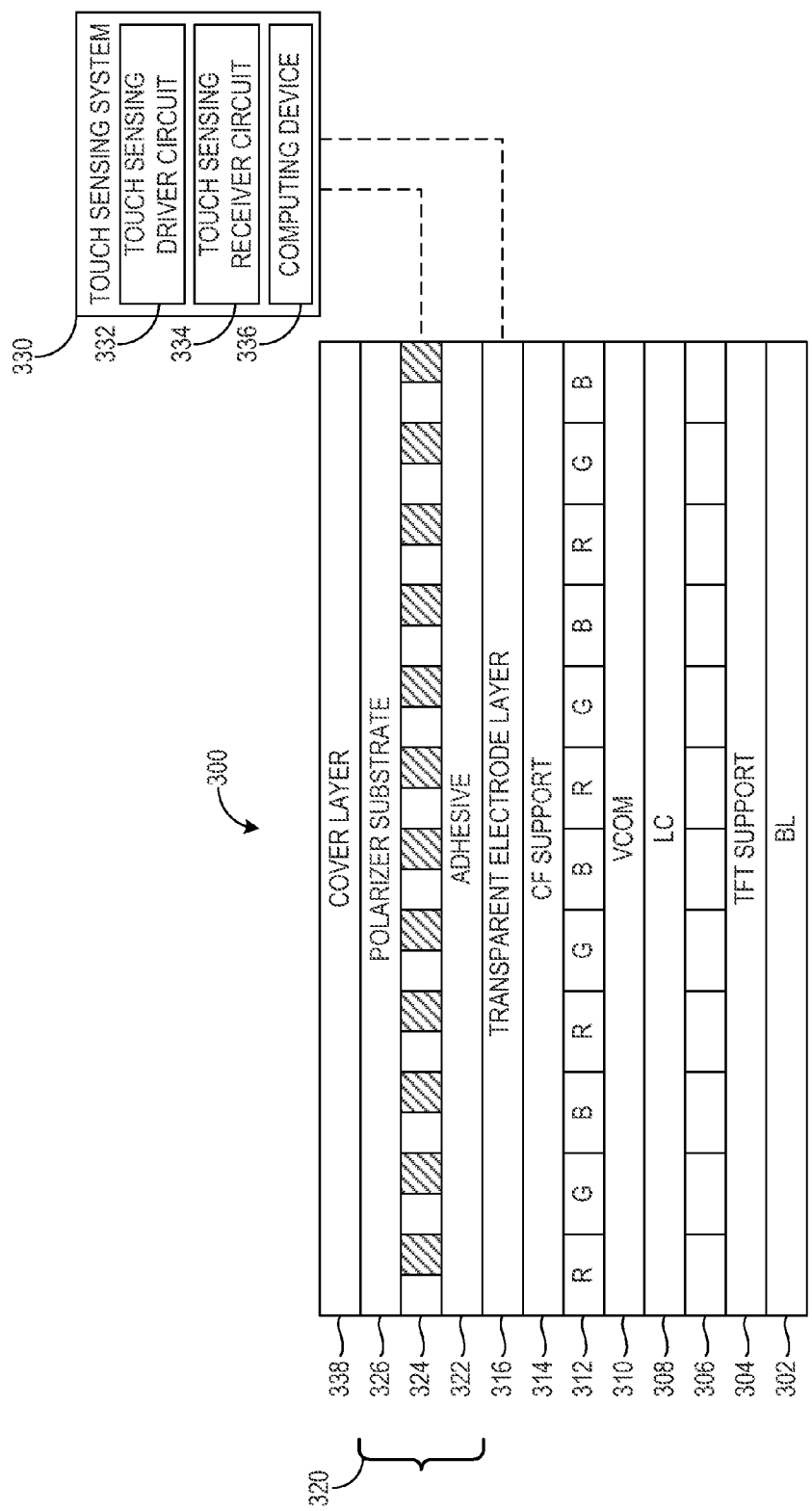
FIG. 3 shows a graphical representation of optical characteristics of an example wire grid polarizer.

A wire grid polarizer having sufficient electrical conductivity and suitable pitch may be utilized as both a touch sensor electrode and as an optical polarizer in a touch sensitive display device. Such a wire grid polarizer may be placed at various locations in a touch sensitive display device. FIG. 3 depicts an embodiment of a touch sensitive display device 300 that illustrates one potential placement of the wire grid polarizer. The display device 300 comprises a backlight unit (BL) 302, a TFT support layer 304 (TFT SUPPORT), and a TFT layer 306 disposed on the TFT support layer 304. A vertically aligned liquid crystal layer (VALC) 308 is disposed between the TFT layer 306 and a common voltage layer 310. For other liquid crystal types, such as IPS or FFS, the common voltage layer may be positioned elsewhere, such as below the pixel electrode plane. For purposes of illustration, just a VALC will be used as an example. The first polarizer may be included at a location between the backlight unit 302 and the liquid crystal layer 308. The display device 300 further comprises a color filter layer 312, depicted schematically as a series of red, green and blue filters, supported by a color filter support layer 314 (CF SUPPORT). The color filter support layer 314 may be formed from a glass material, or any other suitable material.

In the depicted embodiment, the touch sensing structures of the touch sensitive display device 300 are located between the display and a touch surface of the device. Further, a transparent touch sensor electrode layer 316 is formed from a transparent conductor, such as indium tin oxide, deposited on the color filter support layer 314. A conductive polarizer 320 is coupled to the transparent touch sensor electrode layer 316 via an adhesive layer 322 that also may serve as a dielectric layer, and forms a second touch sensor electrode. The conductive polarizer 320 comprises a layer of patterned conductors 324 formed on a substrate 326, which may be a flexible film substrate. The conductive polarizer 320 may be a wire grid polarizer, or any other suitable type of conductive polarizer. Any suitable material may be used as adhesive layer 322. Examples include, but are not limited to, optically clear pressure sensitive adhesives and optically clear resins.

To enable touch sensing, the conductive polarizer 320 and the transparent touch sensor electrode layer 316 are each electrically connected to a touch sensing system 330 comprising a touch sensor driving circuit 332, a touch sensor receiving circuit 334, and a computing device 336 configured to control the touch sensor driving and receiving circuits, and also to detect touch events from the operation of the touch sensor driving and receiving circuits. It will be understood that in various embodiments, the transparent touch sensor electrode layer 316 may be connected to either of the touch sensor driving circuit 332 and the touch sensor receiving circuit 334, and the conductive polarizer 320 may be coupled to the other of the touch sensor driving circuit 332 and the touch sensor receiving circuit 334.

The conductive polarizer 320 of the embodiment of FIG. 3 is positioned close to a cover layer 338 (e.g. impact-resistant glass), and is thus close to a touch surface 340 of the display device 300. This may help to improve hover sensing compared to an in-cell touch sensor device. It will be noted that the illustration of FIG. 3 may omit various layers that are present in an actual device, such as a decorative bezel between the conductive polarizer and the touch surface 340.

The use of a conductive polarizer 320 as a touch sensor electrode may allow the omission of multiple layers of materials from a device compared to a similar device having an ordinary touch sensor. For example, as described above, each conventional touch sensor electrode may include an electrode layer, a substrate layer, and an adhesive layer. Thus, the use of the conductive polarizer as a touch sensor electrode may allow these three layers to be omitted. Also, forming the transparent electrode layer on the color filter support allows the omission of a substrate and adhesive for those electrodes as well.

The use of a conducting polarizer such as a wire grid polarizer further may offer superior optical performance compared to a stretched PVA polarizer. Additionally, the use of a polarizer as touch sensor electrodes may position the touch sensor relatively close to a touch surface of a device, and thus may facilitate hover detection. Also, the relatively high electrical conductivity of a wire grid polarizer (which may be manufactured from a metal such as aluminum) may allow scanning of the touch sensing electrodes to be performed at higher frequencies than the use of conventional transparent electrode materials, and thus to avoid interference from lower frequency noise. For example, in some embodiments, the touch sensing system 330 may be configured to scan at frequencies of 25 kHz to 900 kHz. In other embodiments, any other suitable scanning frequency may be used.

Figure 4:
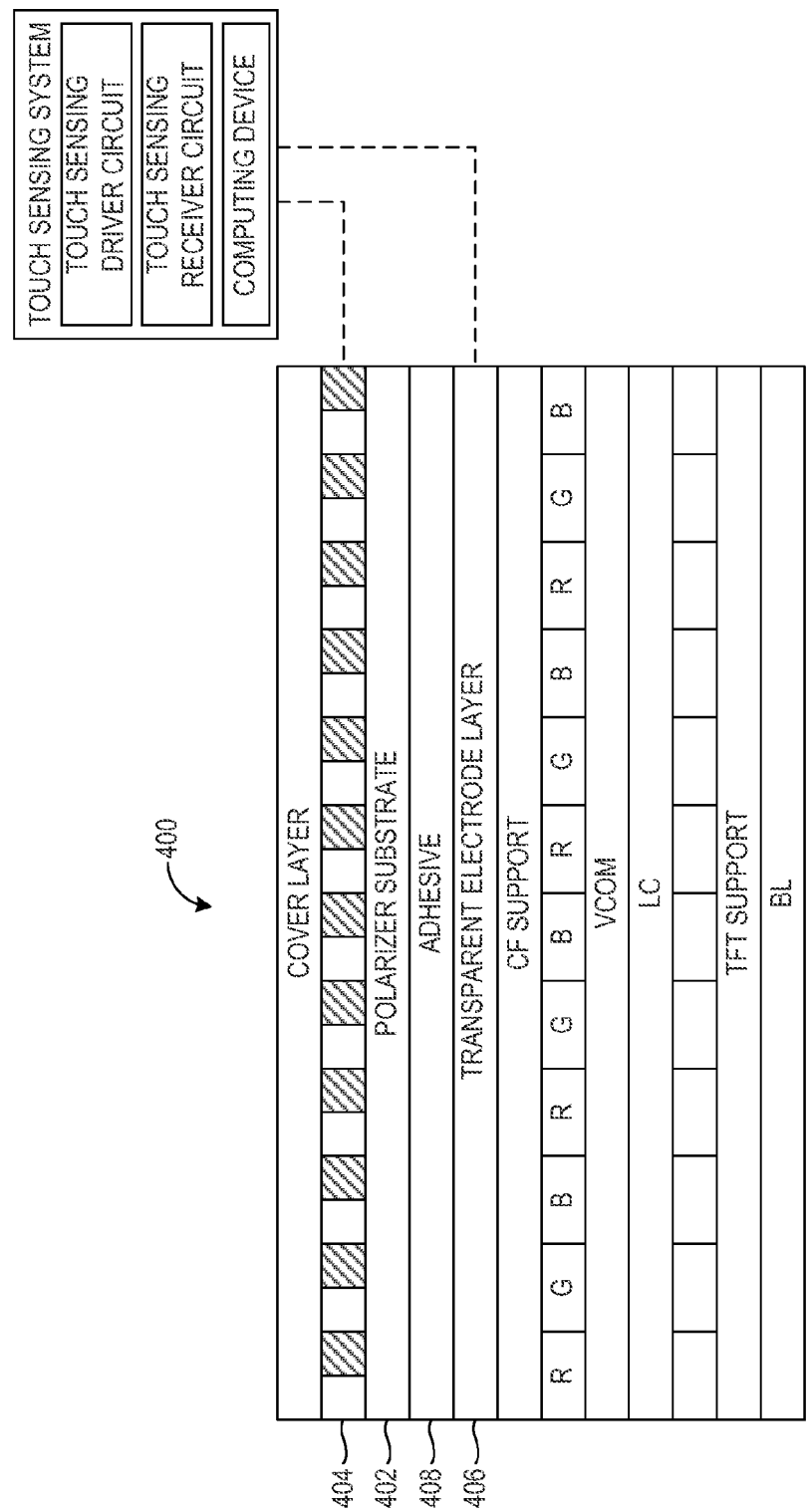
FIG. 4 shows a schematic depiction of layers of a touch sensitive display device according to another embodiment of the disclosure.

In the embodiment of FIG. 3, the conductive polarizer 320 is coupled to the transparent touch sensor electrode layer 316 in such a manner that the layer of patterned conductors 324 is positioned between the polarizer substrate 326 and the transparent touch sensor electrode layer 316. In other embodiments, as depicted at 400 in FIG. 4, the polarizer substrate 402 may be positioned between the patterned conductive layer 404 and the transparent touch sensor layer 406. In such embodiments, the polarizer substrate 402 and adhesive layer 408 may together act as a dielectric barrier between the patterned conductive layer 404 of the conductive polarizer and the transparent electrode layer.

Figure 5:
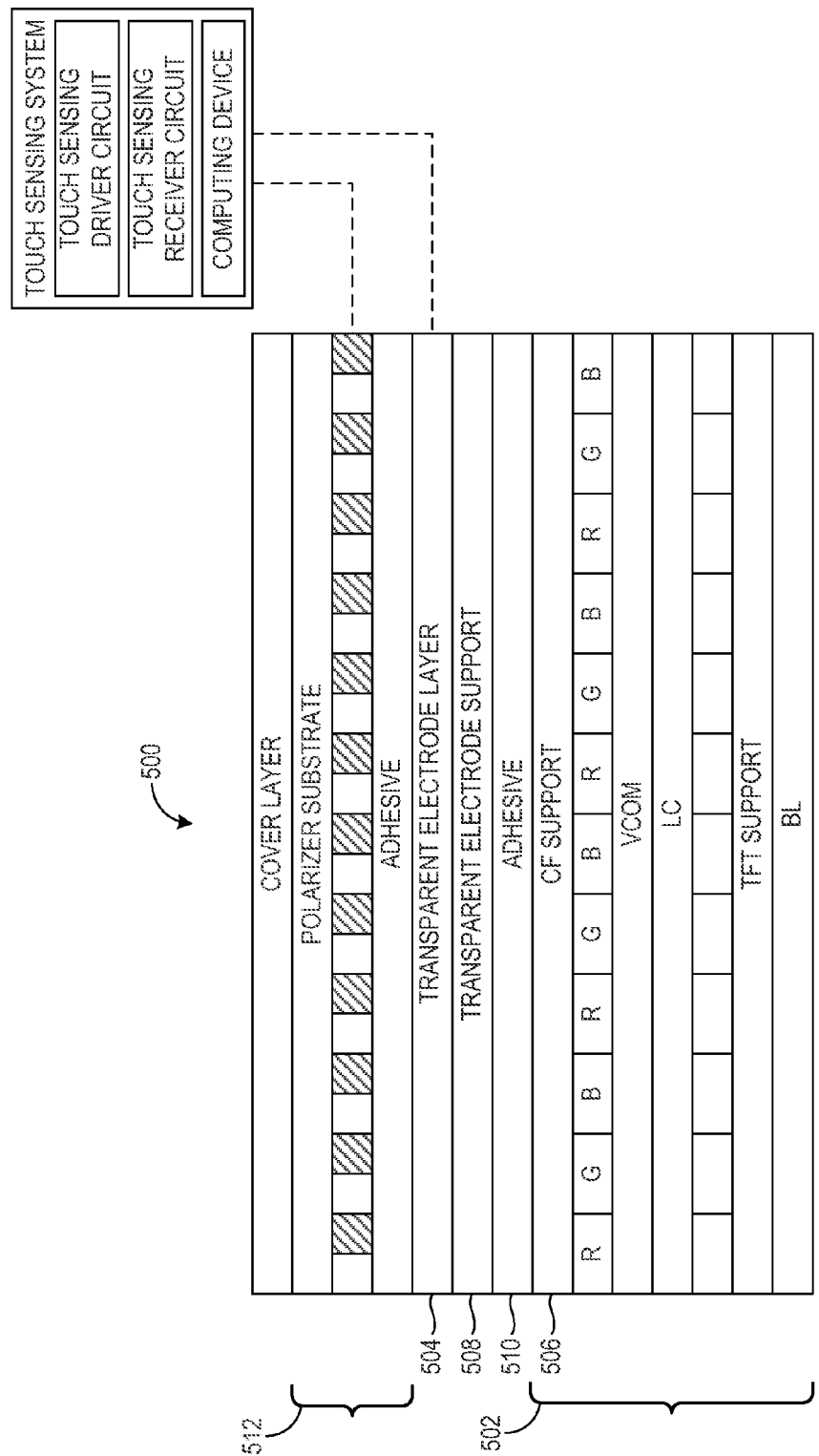
FIG. 5 shows a schematic depiction of layers of a touch sensitive display device according to another embodiment of the disclosure.

FIG. 5 shows another embodiment of a touch sensitive display device 500 utilizing a conductive polarizer as a touch sensor electrode. Display device 500 comprises a display 502 having the structures described above with regard to FIG. 3, which are not described in further detail here. Display device 500 differs from the device of FIG. 3 in that the transparent electrode layer 504 of display device 500 is not formed on the color filter support 506 of the display 502, but rather is formed on a transparent electrode support 508, such as a substrate film, that is coupled to the color filter support 506 via an adhesive 510. The conductive polarizer 512 is then adhered to the transparent electrode layer 504 via an adhesive 514. The configuration of FIG. 5 may allow the transparent electrodes to be manufactured separately from the color filter support and then adhered to the color filter support during device assembly, which may facilitate device manufacturing. However, the configuration of FIG. 5 may be somewhat thicker than that of FIG. 3 with the addition of the transparent electrode support 508 and adhesive 510.

Figure 6:
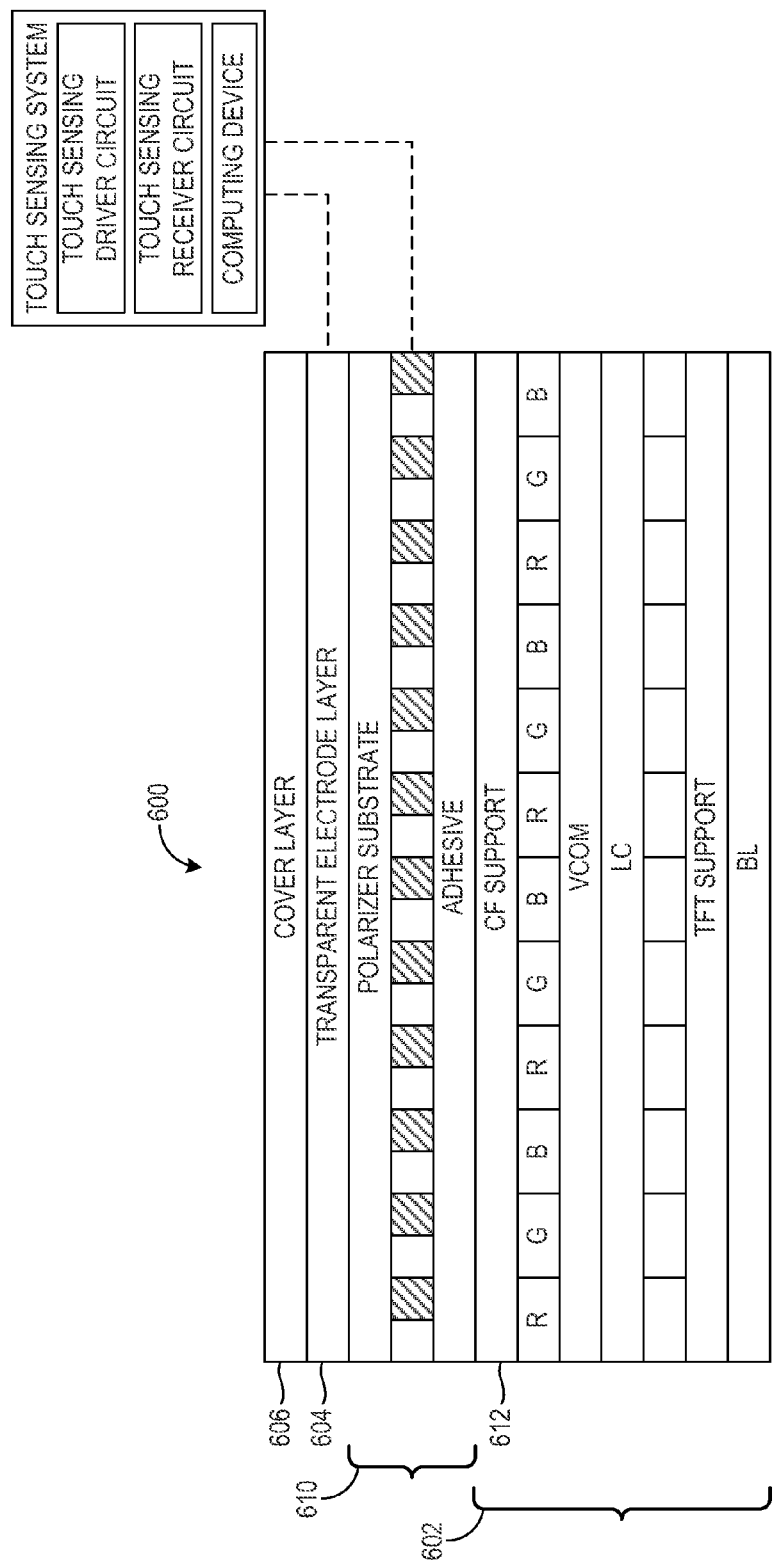
FIG. 6 shows a schematic depiction of layers of a touch sensitive display device according to another embodiment of the disclosure.

FIG. 6 shows yet another embodiment of a touch sensitive display device 600 utilizing a conductive polarizer as a touch sensor electrode. Display device 600 comprises a display 602 having the structures described above with regard to FIG. 3. However, the transparent electrode layer 604 is formed on a side of the cover layer 606, rather than on the color filter support layer 608 (as shown in FIG. 3) or a dedicated substrate layer (as shown in FIG. 5). An adhesive layer (not shown) may be used to bond the conductive polarizer 610 to the cover layer 606 and transparent electrode layer 604. The conductive polarizer 610 is also depicted as being adhered to the color filter support layer 612. As the transparent electrode layer is located on the opposite side of the layer of material that forms the touch surface, the configuration of FIG. 6 may provide for particularly sensitive hover detection.

Figure 7:
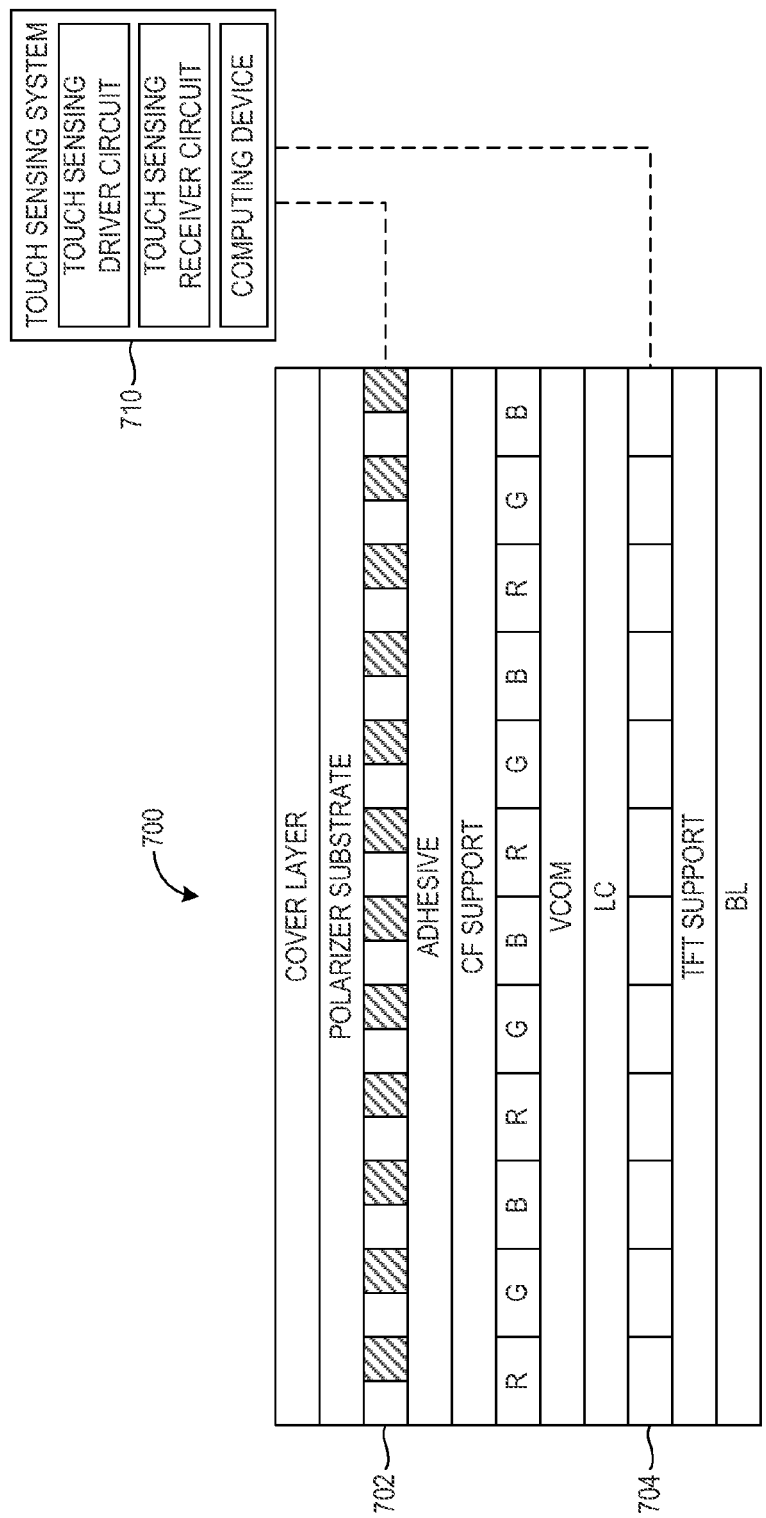
FIG. 7 shows a schematic depiction of layers of a touch sensitive display device according to yet another embodiment of the disclosure.

FIG. 7 illustrates a further embodiment of a touch sensitive display device 700 utilizing a conductive polarizer 702 as a touch sensor electrode. In contrast with the touch sensitive devices described above, display device 700 does not include a dedicated transparent electrode layer for touch sensing. Instead, display device 700 utilizes the conductive elements 702 of the conductive polarizer and the TFT layer 704 of the device. FIG. 7 shows each of these structures connected to a touch sensing system 710. As such, the TFT layer 704 may be used for touch detection and image display in a time-multiplexed manner at a sufficiently high frequency as not to be perceptible by the human eye. In some embodiments, the TFT layer may be configured to accommodate potentially higher voltages used for touch detection compared to voltages used for image display.

A conductive polarizer such as a wire grid polarizer may have individual conductive features with a nanometer-scale pitch. As to the conductive features of a wire grid polarizer are electrically insulated from one another, groups of adjacent conducting features may be connected together to form each electrode for touch sensing. A group of conducting features of a conducting polarizer that are electrically connected to form a single electrode may be referred to herein as an electrode region of the conductive polarizer.

Figure 8:
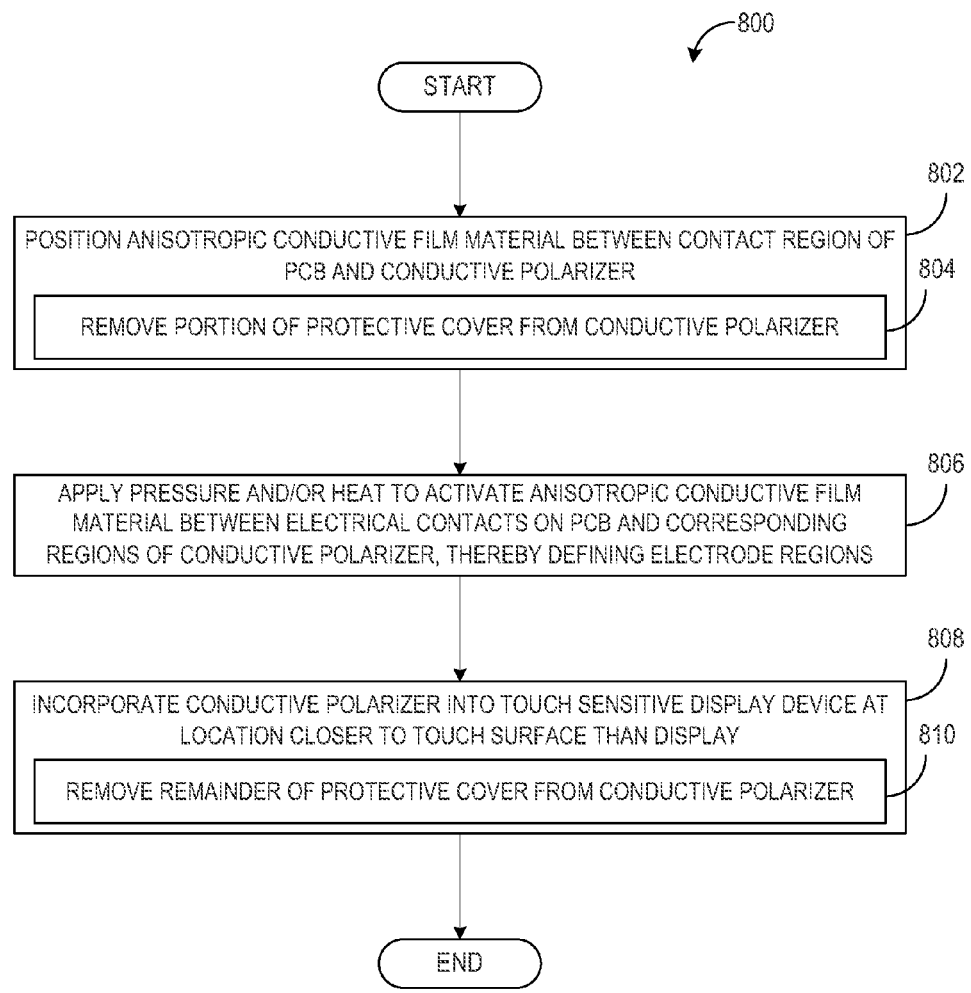
FIG. 8 shows a flow diagram depicting an embodiment of a method for assembling a touch sensitive display device.
Figure 9A:
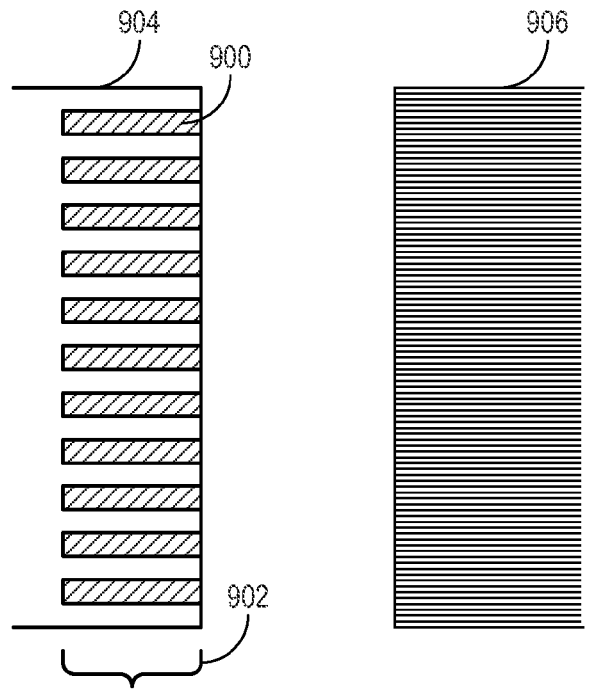
FIGS. 9A-9D illustrate an example implementation of the method of FIG. 8.

FIG. 8 shows an embodiment of a method 800 for defining electrode regions in a conductive polarizer and then assembling a touch sensitive display device utilizing the conductive polarizer in a touch sensor. Method 800 comprises, at 802 positioning an anisotropic conductive film material between a contact region of a printed circuit board (PCB) (e.g. a flexible printed circuit board) and a conductive polarizer, such that the anisotropic conductive film material is in contact with the conductive polarizing features (e.g. metal lines of a wire grid polarizer) of the conductive polarizer. The contact region of the printed circuit board may provide connections to a touch sensing driver or touch sensing receiver circuit, and includes a plurality of electrical contacts each corresponding to a desired electrode region to be defined on the conductive polarizer. FIG. 9A shows a schematic depiction of a plurality of electrical contacts 900 on a contact region 902 of a printed circuit board 904, and also a wire grid polarizer 906 to which the printed circuit board 904 is to be attached. It will be understood that the pitch of the conductive features of the conductive polarizer is greatly exaggerated for clarity.

Figure 9B:
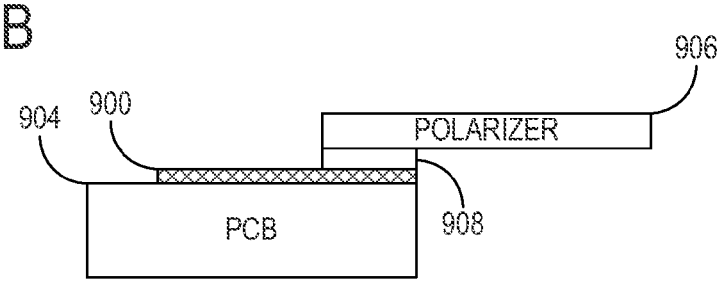

FIG. 9B shows a schematic side view of one of contacts 900, the printed circuit board 904, the wire grid polarizer 906, and the anisotropic conductive film material 908. An anisotropic conductive film material positioned between a printed circuit board and another structure may be processed via pressure and/or heat to form electrical pathways between contacts on the printed circuit board and the other structure when heat and pressure is applied. In this manner, the anisotropic conductive film material may electrically and mechanically connect the printed circuit board to the other structure. Further, the electrically conductive paths formed are limited to the areas between each contacts and a portion of the other structure that directly faces the contact, as the raised profile of the contacts compared to surrounding areas of the printed circuit board causes activation of that portion of the anisotropic conductive film material when pressure and/or heat are applied. As such, the widths of each electrode region of the conductive polarizer are defined by the widths of the corresponding electrical contact on the printed circuit board. In this way, electrical connections to the very fine features of the conductive polarizer may be established via low-precision printed circuit board electrical contacts.

Returning to FIG. 8, in some embodiments, method 800 may comprise, at 804, removing a portion of a protective cover from a conductive polarizer, wherein the portion is located over a region of the conductive polarizer to be joined to an electrical contact region of a printed circuit board. Contaminants such as dust may cause malfunction of a conductive polarizer, and may be very difficult to remove from the conductive polarizer once contamination occurs. Thus, a conductive polarizer may be covered with a protective cover during manufacturing to protect it from contaminants during storage, shipping, etc. As the contact region of the printed circuit board may be joined to the conductive polarizer in a different, earlier manufacturing step than the incorporation of the conductive polarizer and printed circuit board into a body of the touch sensitive display device, the above-described portion of the protective cover is first removed to allow connection of the printed circuit board. The remainder of the protective cover may be removed at a later manufacturing step.

Figure 9C:
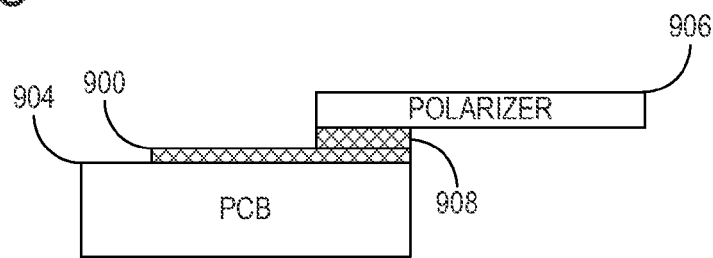
Figure 9D:
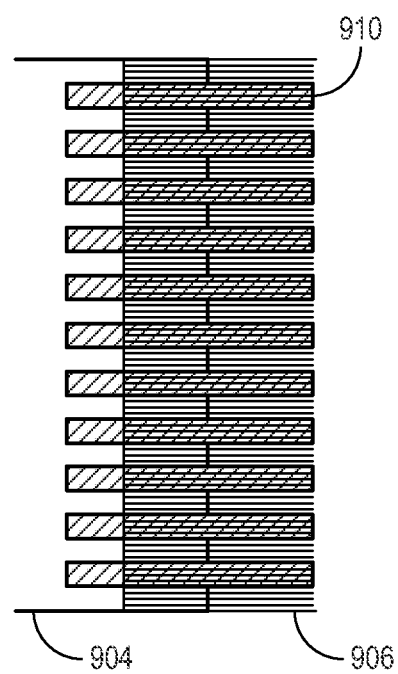

Method 800 further comprises, at 806, applying pressure and/or heat to activate the anisotropic conductive film material between the electrical contacts on the printed circuit board and the corresponding regions of the conductive polarizer, thereby defining electrode regions on the conductive polarizer. The electrode regions may have any suitable width and separation, and the widths and locations of the electrode regions may be defined entirely by the widths and locations of the electrical contacts on the printed circuit board to which the conductive polarizer is attached. As one non-limiting example, these structures each may have a width of 3-8 mm. FIG. 9C schematically illustrates a conductive path having been formed between the polarizer 906 and electrical contact 900 via application of heat and/or pressure to activate the anisotropic electrical film material 908. FIG. 9D illustrates an example arrangement of conductive regions 910 formed by the activation of the anisotropic conductive film material 908 between the electrical contact 900 and the conductive polarizer 906.

Method 800 further comprises, at 808, incorporating the conductive polarizer into the touch sensitive display device at a location closer to the touch surface of the device than a display used to produce an image for display by the device. Incorporating the conductive polarizer into the touch sensitive display may include various processes. For example, as indicated at 810, a remainder of the protective cover may be removed from the conductive polarizer.

The conductive polarizer may be incorporated into the touch sensitive display device at any suitable location within a stack of structures that forms the device. For example, the conductive polarizer may be incorporated into the touch sensitive display device at a location closer to a display surface than a color filter support on which a transparent electrode is formed, as shown in FIG. 3. Where the conductive polarizer comprises a substrate layer supporting a plurality of conductive polarizing elements, the substrate layer may be positioned between the transparent electrode layer and the conductive polarizing elements, or between the conductive polarizing elements and a touch surface of the touch sensitive display device, as non-limiting examples.

As another example, the conductive polarizer may be incorporated into the touch sensitive device on either side of a transparent electrode structure formed on a dedicated substrate film, as shown in FIG. 5. As a further example, the conductive polarizer may be incorporated into the touch sensitive device behind a cover layer on which a transparent electrode is formed, as illustrated in FIG. 6. As yet another example, the conductive polarizer may be incorporated into the touch sensitive device in such a manner that a TFT array of a display used in the touch sensitive device may be used along with the conductive polarizer to sense touch, as described above with regard to FIG. 7. In any of these embodiments, any suitable structure(s) and/or method(s) may be used to fasten the conductive polarizer to other structures in the touch-sensitive display device. Examples include, but are not limited to, optically clear resins and optically clear, pressure-sensitive adhesives.

Figure 10:
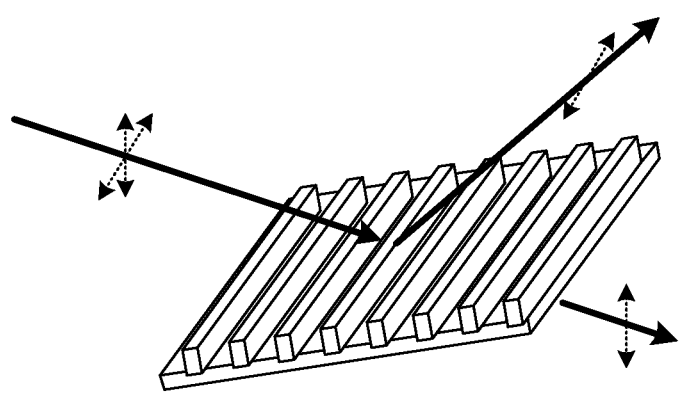
FIG. 10 schematically illustrates reflective polarization.

A conductive polarizer may be a reflective polarizer, in that incident light is transmitted or reflected depending upon polarization state, as shown in FIG. 10. As such, in some instances, a conductive polarizer in a device may be visible from some viewing angles, appearing as a metallic reflection. Thus, in some embodiments a visible light absorbing material may be located between each conductive polarizing element (e.g. each wire in a wire grid polarizer) and the touch surface of the device. This may help to avoid the visible occurrence of such reflections.

Figure 11:
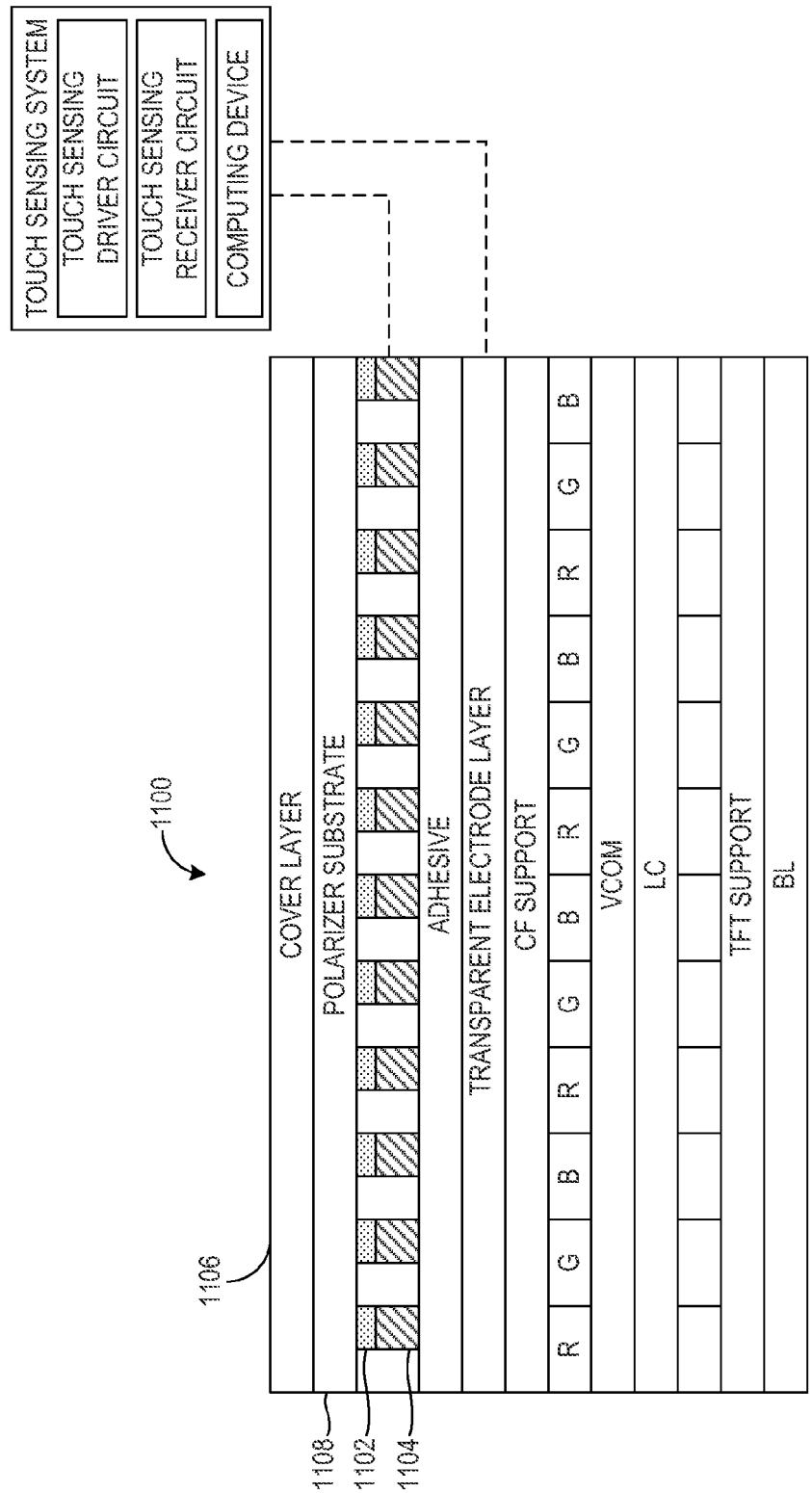
FIG. 11 shows a schematic depiction of a touch sensor comprising a reflective polarizer and light absorbing structures according to an embodiment of the disclosure.

FIG. 11 shows an example embodiment of a touch sensitive display device 1100 comprising a visible light absorbing layer 1102 located between each conducting element 1104 of a conductive polarizer and a touch surface 1106 of the device. The visible light absorbing layer 1102 takes the form of a layer of material positioned between each conductive polarizing element 1104 of the conductive polarizer and a support layer 1108 of the polarizing substrate. The visible light absorbing layer 1102 may comprise any suitable material or materials, including but not limited to one or more visible light absorbing dyes and/or pigments, as well as other materials to allow the deposition, curing, and/or other processing of the visible light absorbing layer. The visible light absorbing layer 1102 may be formed integrally with the polarizer (e.g. by applying the visible light absorbing layer to substrate, then the conductive layer, and then patterning the conducting layer and visible light absorbing layer to form the conductive polarizer), or in any other suitable manner. In other embodiments the visible light absorbing layer may be similarly formed as a cap over each conductive polarizing element.

By utilizing a conductive polarizer as an electrode layer in a touch sensor, a touch sensitive display device may be made to have a thinner profile than a similar touch sensitive display device that uses conventional dedicated electrodes, separate from the polarizers, for touch sensing. The reduction in the number of layers also may reduce a number of reflections in a light path from the backlight of the device to the touch surface, which may help to improve brightness. Additionally, the higher visible light transmittance of a wire grid polarizer (and potentially other conductive polarizers) than a stretched PVA polarizer also may help to improve brightness, which may help to save battery power. Further, as the wire grid polarizer is located between the display layers and the touch surface, hover inputs may be detected more sensitively than with in-cell touch sensors. Also, the higher conductivity of a wire grid polarizer (e.g. made of patterned aluminum) compared to indium tin oxide may allow the touch sensor to run at higher scan frequencies, which may help to reduce interference from electronic noise sources at lower frequencies.

Figure 12:
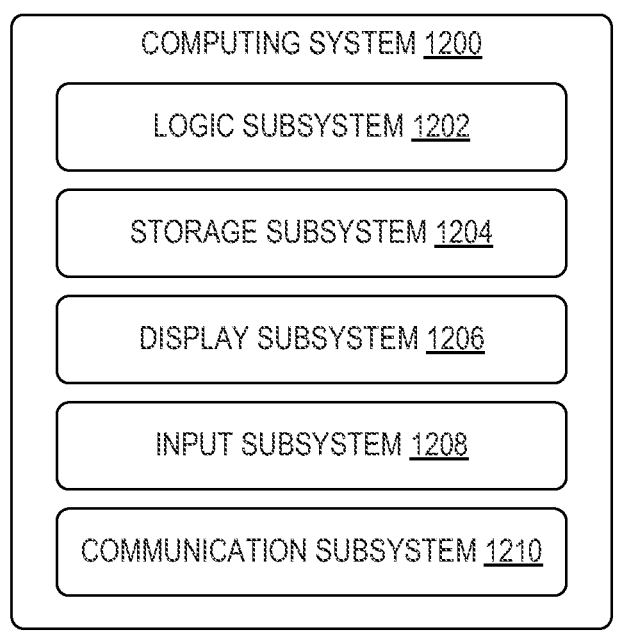
FIG. 12 shows a block diagram depicting an example computing device.

As mentioned above, a touch sensitive display device may comprise a computing device configured to receive inputs via a touch sensor comprising a wire grid polarizer, and to provide outputs via a display, among other tasks. FIG. 12 schematically shows a non-limiting embodiment of a computing system 1200. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 also may include a display subsystem 1206, input subsystem 1208, communication subsystem 1210, and/or other components not shown in FIG. 12.

Logic machine 1202 includes one or more physical devices configured to execute instructions. For example, logic machine 1202 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. Examples include, but are not limited to, operating a touch sensor and a display of a touch sensitive display device.

Logic machine 1202 may include one or more processors configured to execute software instructions. Additionally or alternatively, logic machine 1202 may include one or more hardware or firmware logic machines configured to execute hardware or firmware instructions. Processors of logic machine 1202 may be single-core or multi-core, and the instructions executed thereon may be configured for sequential, parallel, and/or distributed processing. Individual components of logic machine 1202 optionally may be distributed among two or more separate devices, which may be remotely located and/or configured for coordinated processing. Aspects of logic machine 1202 may be virtualized and executed by remotely accessible, networked computing devices configured in a cloud-computing configuration.

Storage machine 1204 includes one or more physical devices configured to hold instructions executable by logic machine 1202 to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices, and excludes propagating signals per se. However, aspects of the instructions described herein alternatively may be propagated as a propagating signal by a communication medium, as opposed to being stored by a storage medium.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1200 implemented to perform a particular function. In some cases, a program may be instantiated via logic machine 1202 executing instructions held by storage machine 1204. It will be understood that different programs engines may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

Display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

Input subsystem 1208 may comprise or interface with one or more user-input devices such as a keyboard, mouse, touch screen (e.g. a touch sensor utilizing a conducive polarizer as a sensor electrode), or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch sensitive display device, comprising:
   a display;
   a transparent electrode layer comprising a plurality of transparent electrodes;
   a conductive polarizer coupled to the transparent electrode layer via a dielectric layer;

a touch sensing driver circuit electrically connected to one of the transparent electrode layer and the conductive polarizer;

a touch sensing receiver circuit electrically connected to another of the transparent electrode layer and the conductive polarizer; and an anisotropic conductive film material electrically connecting the conductive polarizer to one of the touch sensing driver circuit and the touch sensing receiver circuit via a flexible printed circuit board, the flexible printed circuit board having contacts each defining a respective electrode region via the anisotropic conductive film material, such that each contact is electrically connected to a respective plurality of conductive polarizing elements of the conductive polarizer via the anisotropic conductive film material.

2. The touch sensitive display device of claim 1, wherein the conductive polarizer comprises a wire grid polarizer.

3. The touch sensitive display device of claim 2, wherein the wire grid polarizer comprises a plurality of conductive wires and a plurality of visible light absorbers, each visible light absorber disposed between a corresponding conductive wire and the touch surface.

4. The touch sensitive display device of claim 1, wherein the conductive polarizer comprises a substrate on which conductive polarizing elements are formed, and wherein the substrate is positioned between the conductive polarizing elements and the transparent electrode layer.

5. The touch sensitive display device of claim 1, wherein the conductive polarizer comprises a substrate on which conductive polarizing elements are formed, and wherein the substrate is positioned between the conductive polarizing elements and the touch surface.

6. The touch sensitive display device of claim 1, wherein the contacts define an electrode width for the conductive polarizer.

7. The touch sensitive display device of claim 1, wherein each electrical contact has a width of between 3 mm and 8 mm.

8. The touch sensitive display device of claim 1, wherein the touch sensing driver circuit is configured to apply a scanning voltage at a frequency of 25 kHz to 900 kHz.

9. The touch sensitive display device of claim 1, wherein the conductive polarizer is coupled to the transparent electrode layer via one or more of an optically clear resin and an optically clear pressure sensitive adhesive.

10. A touch sensitive display device, comprising:
a touch surface;
a display comprising
a thin film transistor layer and
a color filter structure comprising a color filter layer and a color filter support layer;
a wire grid polarizer coupled to the color filter support structure;
a touch sensing driver circuit electrically connected to one of the thin film transistor layer and the conductive polarizer;
a touch sensing receiver circuit electrically connected to another of the thin film transistor layer and the conductive polarizer; and
an anisotropic conductive film material electrically connecting the conductive polarizer to one of the touch sensing driver circuit and the touch sensing receiver circuit via a flexible printed circuit board, the flexible printed circuit board having contacts each defining an electrode region, such that each contact is electrically connected to a respective plurality of conductive polarizing elements of the conductive polarizer via the anisotropic conductive film material.

11. The touch sensitive display device of claim 10, further comprising a plurality of visible light absorbers, each visible light absorber disposed between a corresponding conductive polarizing element and the touch surface.

12. The touch sensitive display device of claim 11, wherein the visible light absorbers are formed integrally with the wire grid polarizer.

* * * * *